(12) United States Patent
Konno (10) Patent No.: US 8,893,477 B2
(45) Date of Patent: Nov. 25, 2014

(54) EXHAUST EMISSION PURIFYING APPARATUS AND LIQUID LEVEL MEASURING DEVICE

(75) Inventor: Hiroyuki Konno, Ageo (JP)

(73) Assignee: Volvo Powertrain Aktiebolag, Gothenburg (SE)

( * ) Notice: Subject to any disclaimer, the term of this patent is extended or adjusted under 35 U.S.C. 154(b) by 401 days.

(21) Appl. No.: 13/164,422

(22) Filed: Jun. 20, 2011

(65) Prior Publication Data

US 2011/0247319 A1 Oct. 13, 2011

Related U.S. Application Data

(63) Continuation of application No. PCT/JP2009/067260, filed on Oct. 2, 2009.

(30) Foreign Application Priority Data

Dec. 22, 2008 (JP) ................................. 2008-325034

(51) Int. Cl.
*F01N 3/00* (2006.01)
*G01F 23/26* (2006.01)
*F01N 13/00* (2010.01)
*G01F 23/00* (2006.01)
*F01N 3/20* (2006.01)
*F01N 3/10* (2006.01)
*B01D 53/94* (2006.01)

(52) U.S. Cl.
CPC .............. *F01N 3/208* (2013.01); *G01F 23/263* (2013.01); *Y02T 10/24* (2013.01); *G01F 23/266* (2013.01); *F01N 2900/1818* (2013.01); *F01N 13/009* (2013.01); *G01F 23/0076* (2013.01); *F01N 2610/02* (2013.01); *B01D 53/9477* (2013.01); *F01N 3/106* (2013.01); *F01N 2900/0418* (2013.01); *F01N 2900/1814* (2013.01)
USPC .................... 60/286; 60/277; 60/295; 60/282

(58) Field of Classification Search
CPC ......... F01N 3/208; F01N 3/206; F01N 3/106; G01F 23/263; G01F 23/266

USPC ........... 60/286, 287, 277, 295, 282, 297, 381, 60/303; 73/304 C; 340/620
See application file for complete search history.

(56) References Cited

U.S. PATENT DOCUMENTS 7,758,826 B2 7/2010 Satou et al.
7,842,267 B2 11/2010 Nishina et al.
(Continued)

FOREIGN PATENT DOCUMENTS

CN 101087936 A 12/2007
JP 7-198446 A 8/1995
(Continued)

OTHER PUBLICATIONS

English Language Machine Translation of JP 2008248708.*

(Continued)

*Primary Examiner* — Audrey K Bradley
*Assistant Examiner* — Wesley Harris
(74) *Attorney, Agent, or Firm* — Foley & Lardner LLP (57) ABSTRACT

The present invention provides an exhaust emission purifying apparatus having a liquid level measuring device in which, when a liquid level (measured liquid level) measured by a liquid level indicator of a sensor is equal to or than a measurable lower limit, the measured liquid level is output. On the other hand, when the measured liquid level is less than the measurable lower limit, the liquid level estimated based on a consumption of a liquid reducing agent or its precursor in a reducing agent tank and a tank cross-sectional area is output. The liquid level of the liquid reducing agent or its precursor is estimated in a range in which the liquid level may not be accurately measured due to the presence of a concentration meter, whereby the liquid level can be measured over a wide range.

6 Claims, 5 Drawing Sheets

(56) References Cited

U.S. PATENT DOCUMENTS

| | | | |
|---|---|---|---|
| 8,006,483 B2 * | 8/2011 | Matsunaga et al. | 60/286 |
| 8,293,180 B2 | 10/2012 | Matsunaga et al. | |
| 2007/0266697 A1 | 11/2007 | Nishina et al. | |
| 2009/0193793 A1 | 8/2009 | Matsunaga | |

FOREIGN PATENT DOCUMENTS

| | | |
|---|---|---|
| JP | 2000-27627 A | 1/2000 |
| JP | 2004-510151 A | 4/2004 |
| JP | 2005-351253 A | 12/2005 |
| JP | 2008-82201 A | 4/2008 |
| JP | 2008-95601 A | 4/2008 |
| JP | 2008-248708 A | 10/2008 |
| JP | 2008-248710 A | 10/2008 |
| WO | WO 02/27280 A2 | 4/2002 |
| WO | WO 2008/038509 * 4/2008 | F01N 3/18 |

OTHER PUBLICATIONS

English Language Machine Translation of WO 0227280.*
Chinese Office Action, Jul. 25, 2013, 12 pages.

* cited by examiner

| LIQUID LEVEL [mm] | TANK CROSS-SECTIONAL AREA [mm$^2$] |
|---|---|
| 40 | $S_{40}$ |
| 39 | $S_{39}$ |
| 38 | $S_{38}$ |
| ... | ... |
| 1 | $S_1$ |
| 0 | $S_0$ |

EXHAUST EMISSION PURIFYING APPARATUS AND LIQUID LEVEL MEASURING DEVICE

This application is a continuation of PCT/JP2009/067260, filed on Oct. 2, 2009.

BACKGROUND OF THE INVENTION

1. Field of the Invention

The present invention relates to an exhaust emission purifying apparatus, which reduces and purifies nitrogen oxide (NOx) in exhaust gas with the use of a liquid reducing agent or its precursor, and a liquid level measuring device which measures the liquid level of the liquid reducing agent or its precursor stored in a reducing agent tank of the exhaust emission purifying apparatus.

2. Description of Related Art

As a catalytic purifying system that removes NOx contained in exhaust gas of an engine, there has been proposed an exhaust emission purifying apparatus described in Japanese Laid-open (Kokai) Patent Application Publication No. 2000-27627. In the exhaust emission purifying apparatus, a liquid reducing agent or its precursor is injection-supplied to the exhaust upstream side of a NOx reduction catalytic converter at the dosing flow rate corresponding to an engine operation state to subject a reducing agent and NOx to reduction reaction selectively in the NOx reduction catalytic converter, and thus, to purify NOx to harmless water ($H_2O$) and nitrogen ($N_2$).

In the above-mentioned exhaust emission purifying apparatus, if the liquid reducing agent or its precursor is insufficient in amount, or if the concentration of the liquid reducing agent or its precursor is inappropriate, the reducing agent supplied to the NOx reduction catalytic converter is insufficient in amount, and a required NOx purification performance may not be achieved. Thus, as described in Japanese Laid-open (Kokai) Patent Application Publication No. 2008-95601, the present applicant has proposed a technique of attaching a sensor in which a liquid level indicator and a concentration meter are unified to a top wall of a reducing agent tank storing the liquid reducing agent or its precursor therein.

In a sensor disclosed in the related art, a concentration meter is attached to a tip end portion of a liquid level indicator that measures the liquid level from a capacitance change between an inner electrode and an outer electrode having an annular-shaped cross section. Therefore, the capacitance between the inner electrode and the outer electrode near the concentration meter changes, so that the liquid level at this portion cannot be accurately measured. In heavy vehicles such as heavy trucks, since the height of the reducing agent tank is large, the ratio of the range in which the liquid level may not be accurately measured is small, and the range can be ignored.

SUMMARY OF THE INVENTION

Thus, in view of the above-mentioned related art problems, an object of the present technique is to provide an exhaust emission purifying apparatus and a liquid level measuring device which can measure a liquid level of a liquid reducing agent or its precursor over a wider range by estimating the liquid level at a portion lower than an attachment position of a concentration meter from a consumption of the liquid reducing agent or its precursor.

The present technique provides an exhaust emission purifying apparatus, and the exhaust emission purifying apparatus includes: a reducing agent tank which stores therein a liquid reducing agent or its precursor; a reduction catalytic converter which reduces and purifies NOx in exhaust gas with the use of the liquid reducing agent or its precursor; a reducing agent dosing device which injection-supplies the liquid reducing agent or its precursor, stored in the reducing agent tank, to the exhaust upstream side of a reduction catalytic converter at the dosing flow rate corresponding to an engine operation state; and a sensor which is attached to the reducing agent tank so as to hang from the top wall of the reducing agent tank and has a liquid level indicator measuring the liquid level of the liquid reducing agent or its precursor from a capacitance change and a concentration meter measuring the concentration of the liquid reducing agent or its precursor from heat discharge characteristics, the liquid level indicator and the concentration meter being unified, and a control unit with a built-in computer. In the exhaust emission purifying apparatus, when the liquid level measured by the liquid level indicator of the sensor is equal to or greater than a predetermined measurable lower limit, the control unit outputs the measured liquid level. Meanwhile, when the liquid level measured by the liquid level indicator of the sensor is less than the measurable lower limit, the control unit outputs the liquid level estimated based on an integrated value obtained by sequentially integrating the dosing flow rate of the liquid reducing agent or its precursor injection-supplied by the reducing agent dosing device and a tank cross-sectional area.

The present technique provides a liquid level measuring device, and the liquid level measuring device includes: a sensor, which is attached to a reducing agent tank storing therein a liquid reducing agent or its precursor so as to hang from the top wall of the reducing agent tank and has a liquid level indicator measuring the liquid level of the liquid reducing agent or its precursor from a capacitance change and a concentration meter measuring the concentration of the liquid reducing agent or its precursor from heat discharge characteristics, the liquid level indicator and the concentration meter being unified, and a control unit with a built-in computer. In the liquid level measuring device, when the liquid level measured by the liquid level indicator of the sensor is equal to or greater than a predetermined measurable lower limit, the control unit outputs the measured liquid level. Meanwhile, when the liquid level measured by the liquid level indicator of the sensor is less than the measurable lower limit, the control unit outputs the liquid level estimated based on a consumption of the liquid reducing agent or its precursor in the reducing agent tank and a tank cross-sectional area.

According to the present technique, as long as the liquid level measured by the liquid level indicator of the sensor is equal to or greater than the measurable lower limit, the measured liquid level is output. Meanwhile, when the liquid level measured by the liquid level indicator of the sensor is less than the measurable lower limit, the liquid level that is estimated based on the integrated value, obtained by sequentially integrating the dosing flow rate corresponding to an engine operation state (or the consumption), and the tank cross-sectional area is output. Accordingly, in the sensor, the liquid level of the liquid reducing agent or its precursor can be estimated even in a range in which the liquid level may not be accurately measured due to the presence of the concentration meter, and therefore, the liquid level can be measured over a wide range.

DESCRIPTION OF THE PREFERRED EMBODIMENTS

Hereinafter, the present technique will be described in detail referring to the attached drawings.

Figure 1:
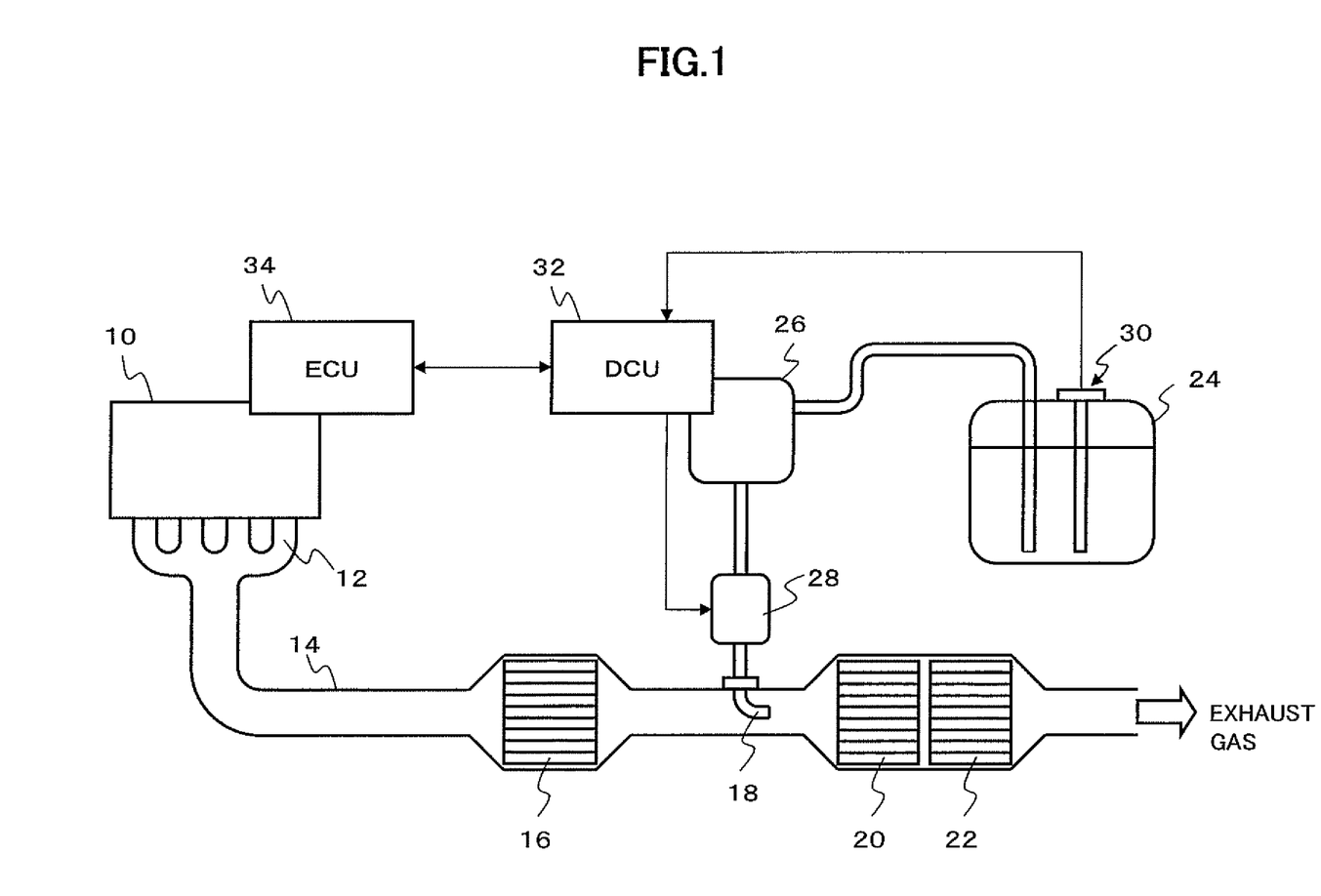
FIG. 1 is an overall configuration view showing an embodiment of an exhaust emission purifying apparatus realizing the present technique.

FIG. 1 shows an overall configuration of an exhaust emission purifying apparatus which selectively reduces and purifies NOx in engine exhaust gas with the use of a urea aqueous solution as a precursor of a liquid reducing agent.

In an exhaust pipe 14 connected to an exhaust manifold 12 of an engine 10, a nitrogen oxidation catalytic converter 16 which oxidizes nitric oxide (NO) to nitrogen dioxide ($NO_2$), an injection nozzle 18 from which the urea aqueous solution is injection-supplied, a NOx reduction catalytic converter 20 which selectively reduces and purifies NOx with the use of ammonia generated from the urea aqueous solution, and an ammonia oxidation catalytic converter 22 which oxidizes ammonia passed through the NOx reduction catalytic converter 20 are arranged in that order along an exhaust gas flow direction. The urea aqueous solution stored in a reducing agent tank 24 is supplied to the injection nozzle 18 through a pump module 26 which sucks and pressure-feeds the urea aqueous solution and a dosing module 28 which controls the dosing flow rate of the urea aqueous solution. The reducing agent dosing device includes the injection nozzle 18, the pump module 26, and the dosing module 28.

In the above-mentioned exhaust emission purifying apparatus, the urea aqueous solution injection-supplied from the injection nozzle 18 is hydrolyzed with exhaust heat and water vapor in exhaust gas to be converted to ammonia. The ammonia selectively reduction reacts with NOx in exhaust gas in the NOx reduction catalytic converter 20 to be purified to harmless $H_2O$ and $N_2$. At that time, in order to enhance a NOx purification efficiency in the NOx reduction catalytic converter 20, NO is oxidized to $NO_2$ in the nitrogen oxidation catalytic converter 16, and the ratio between NO and $NO_2$ in exhaust gas is improved to the ratio appropriate for the reduction reaction. Meanwhile, since the ammonia passed through the NOx reduction catalytic converter 20 is oxidized in the ammonia oxidation catalytic converter 22 arranged at the exhaust downstream side of the NOx reduction catalytic converter 20, the ammonia is prevented from being emitted as it is into the atmosphere.

Figure 2:
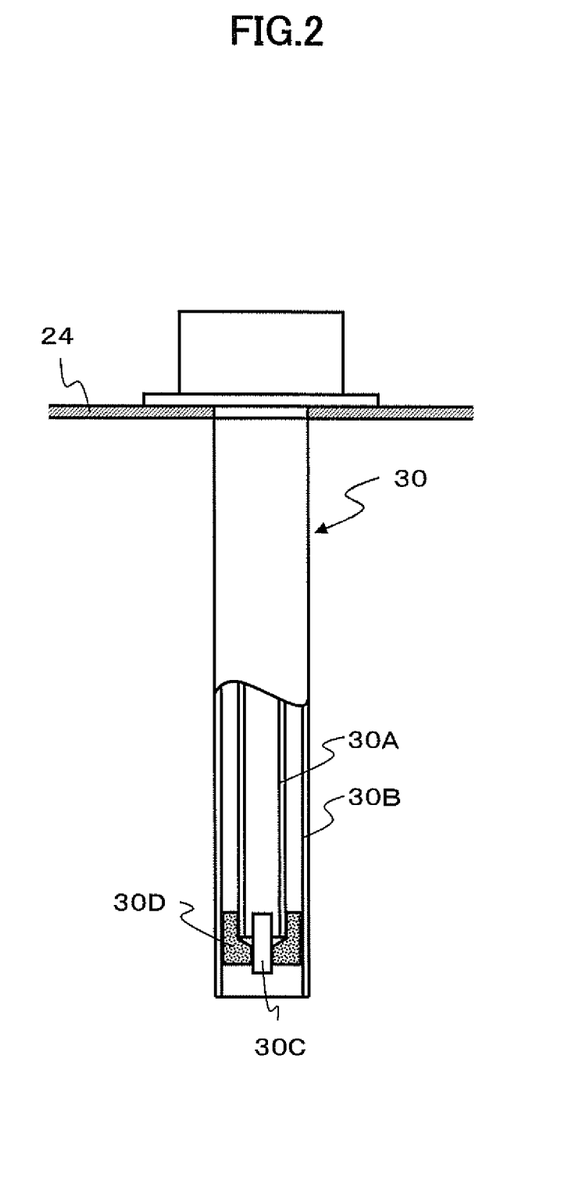
FIG. 2 is an explanatory view showing a structure of a sensor which measures a liquid level and a concentration of a urea aqueous solution.
Figure 3:
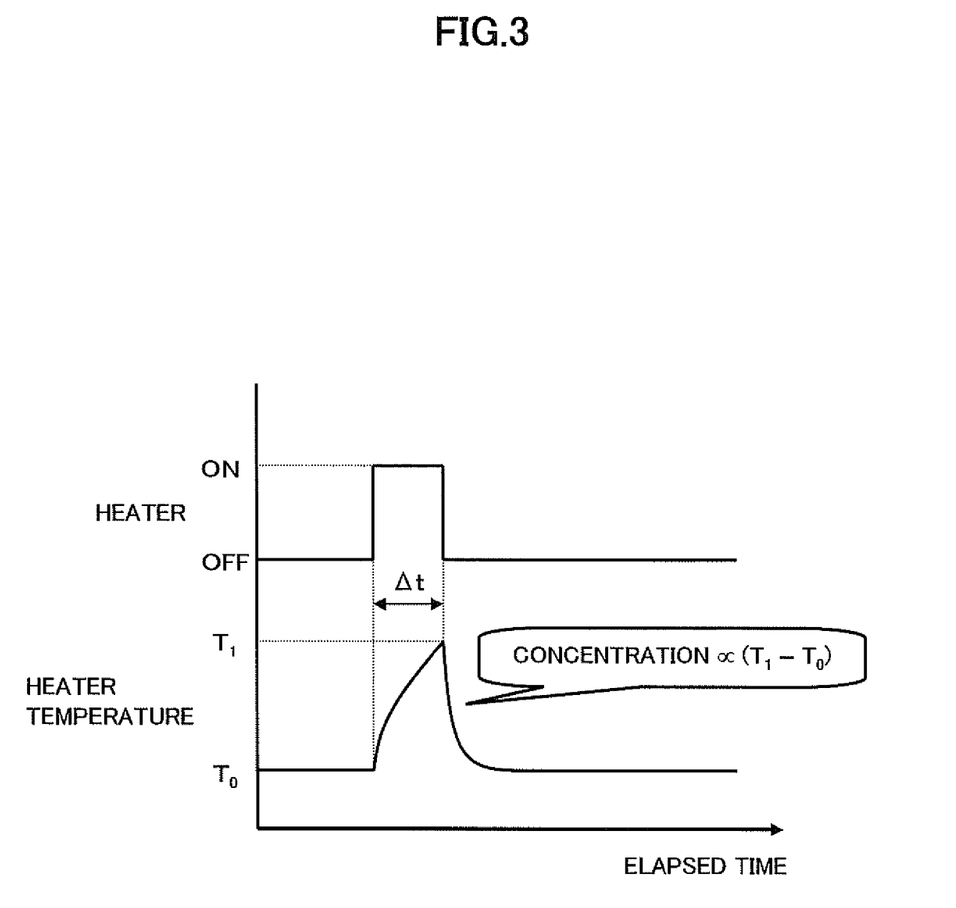
FIG. 3 is an explanatory view showing a concentration measurement principle of the sensor.

To the reducing agent tank 24, a sensor 30 is attached. In the sensor 30, a liquid level indicator and a concentration meter are unified to measure the liquid level and the concentration of the urea aqueous solution, respectively. As shown in FIG. 2, in the liquid level indicator of the sensor 30, an inner electrodes 30A and an outer electrode 30B having annular-shaped cross sections are hung concentrically from a top wall of the reducing agent tank 24 toward the bottom wall, and the liquid level is indirectly measured from a capacitance change between the both electrodes. In the concentration meter of the sensor 30, a ceramic heater 30C (heating element) serving as a temperature sensor is fixed to a tip end portion of the liquid level indicator. As shown in FIG. 3, the concentration is indirectly measured from a temperature rising characteristic ($T_1$-$T_0$) obtained when the ceramic heater 30C is operated for a predetermined time $\Delta t$, that is, the heat discharge characteristics obtained when the urea aqueous solution is used as a heat transfer medium. A holder 30D of FIG. 2 is used for keeping an interval between the inner electrode 30A and the outer electrode 30B approximately constant while fixing the ceramic heater 30C.

A liquid level signal and a concentration signal of the sensor 30 are input to a reducing agent dosing control unit (hereinafter referred to as "DCU (Dosing Control Unit)") 32 with a built-in computer. The DCU 32 receives an input of an exhaust temperature, an engine rotation speed, and a fuel injection flow rate as the engine operation state from an engine control unit (ECU) 34 which electronically controls the engine 10, through a CAN (Controller Area Network), for example. The DCU 32 then calculates the dosing flow rate of the urea aqueous solution, corresponding to the engine operation state, in accordance with a reducing agent dosing program stored in a ROM (Read Only Memory) and the like, and electronically controls the pump module 26 and the dosing module 28 based on the calculation result. The exhaust temperature, the engine rotation speed, and the fuel injection flow rate as the engine operation state may be directly detected using a well-known sensor.

Figure 4:
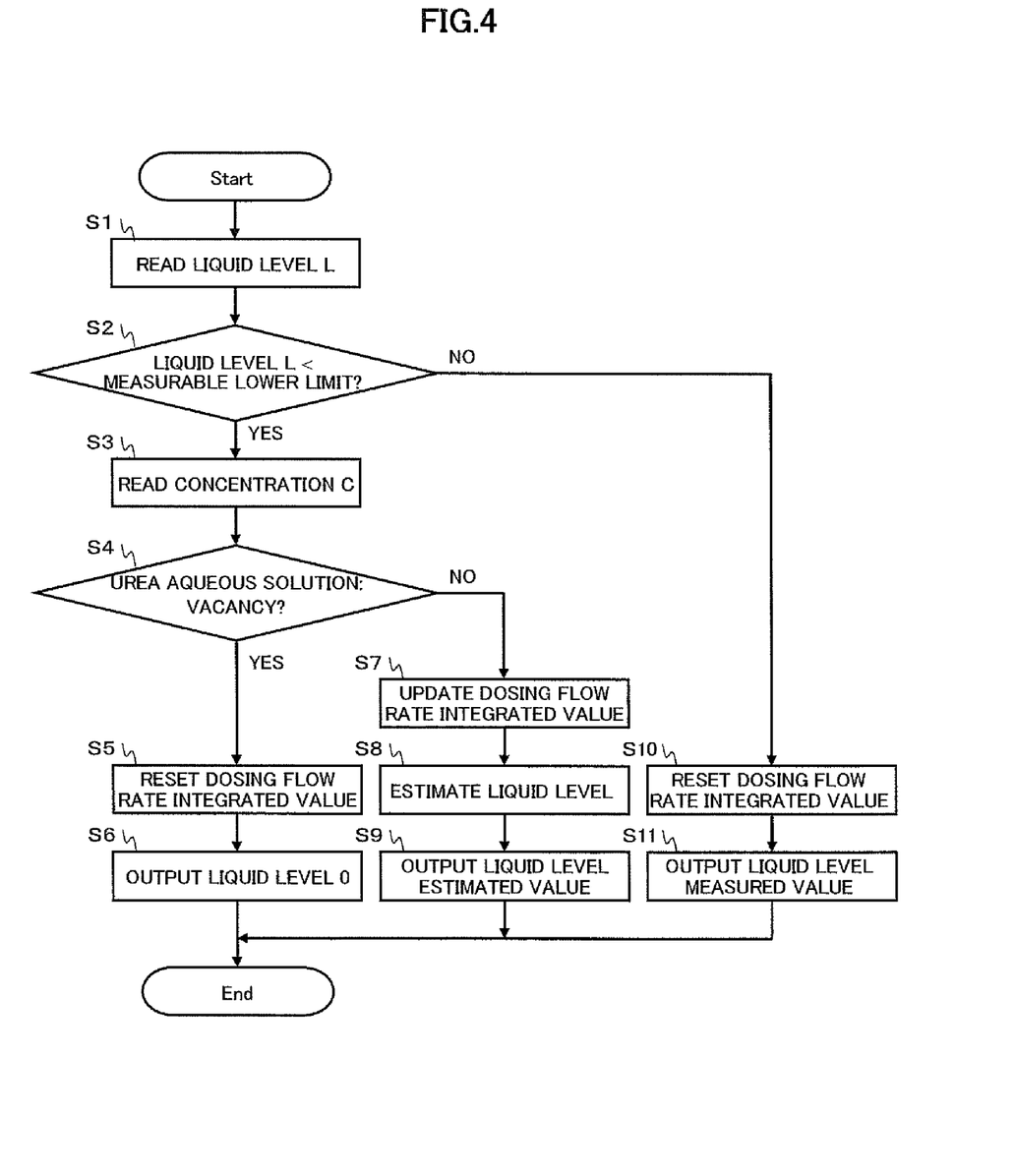
FIG. 4 is a flow chart showing a control program of a liquid level measuring device.

FIG. 4 shows a control program of the liquid level measuring device that is repeatedly executed at every predetermined time interval by the DCU 32, the execution of the control program being triggered by the start of the DCU 32. The DCU 32 executes the reducing agent dosing program that doses the urea aqueous solution at the dosing flow rate corresponding to the engine operation state while executing the control program.

In step 1 (to be abbreviated as S1 in FIG. 4 and the same rule will be applied to the subsequent steps), the DCU 32 reads therein the liquid level L from the liquid level indicator of the sensor 30.

In step 2, the DCU 32 determines whether or not the liquid level L is less than a measurable lower limit. The measurable lower limit specifies the liquid level that is impossible to be accurately measured due to the presence of the concentration meter. For example, the measurable lower limit is suitably set from the liquid level output characteristics of the sensor 30 attached to the reducing agent tank 24. When the liquid level L is less than the measurable lower limit, in the DCU 32, the process proceeds to step 3 (Yes). Meanwhile, when the liquid level L is equal to or greater than the measurable lower limit, in the DCU 32, the process proceeds to step 10 (No).

In step 3, the DCU 32 reads therein a concentration C from the concentration meter of the sensor 30.

In step 4, the DCU 32 determines whether or not no urea aqueous solution is left in the reducing agent tank 24 through whether or not the concentration C is more than a predetermined threshold value. The predetermined threshold value is used for determining whether or not no urea aqueous solution is left by using a concentration measurement principle of the concentration meter and, for example, in a specified urea aqueous solution, the predetermined threshold value is set to a value that cannot be normally acquired. When no urea aqueous solution is left, in the DCU 32, the process proceeds to step 5 (Yes). Meanwhile, when the urea aqueous solution is left, in the DCU 32, the process proceeds to step 7 (No). In order to suppress erroneous determination due to superimposing noise on the concentration signal, it is preferable that when the concentration C is more than the predetermined threshold value continuously for a predetermined number of times, the DCU 32 determines that no urea aqueous solution is left.

In step 5, the DCU 32 resets a dosing flow rate integrated value of the urea aqueous solution. The dosing flow rate integrated value is a control variable for holding an integrated value, obtained by sequentially integrating the dosing flow rate corresponding to the engine operation state, after the liquid level L measured by the liquid level indicator of the sensor 30 is reduced to the measurable lower limit.

In step 6, the DCU 32 outputs a liquid level 0 (vacancy).

In step 7, the DCU 32 doses the dosing flow rate, corresponding to the engine operation state, to the dosing flow rate integrated value and updates the dosing flow rate integrated value.

In step 8, the DCU 32 estimates the liquid level of the urea aqueous solution, stored in the reducing agent tank 24, based on the dosing flow rate integrated value and the tank cross-sectional area of the reducing agent tank 24. Specifically, the DCU 32 divides the dosing flow rate integrated value by the tank cross-sectional area and calculates a decrease of the liquid level after the reduction of the liquid level L to the measurable lower limit. The DCU 32 then subtracts the decrease of the liquid level from the measurable lower limit and estimates the liquid level of the urea aqueous solution.

In step 9, the DCU 32 outputs the estimated value of the liquid level.

In step 10, since the liquid level L is equal to or greater than the measurable lower limit, the DCU 32 resets the dosing flow rate integrated value.

In step 11, the DCU 32 outputs the measured value of the liquid level.

In the above-mentioned liquid level measuring device, when the liquid level L measured by the liquid level indicator of the sensor 30 is equal to or greater than the measurable lower limit, the liquid level L is output. On the other hand, when the liquid level L is less than the measurable lower limit, the liquid level that is estimated based on the dosing flow rate integrated value obtained by sequentially integrating the dosing flow rate corresponding to the engine operation state and the tank cross-sectional area is output. Accordingly, in the sensor 30, even in the range in which the liquid level may not be accurately measured due to the presence of the concentration meter, the liquid level is estimated by calculation base on the dosing flow rate integrated value that is the consumption of the urea aqueous solution, and therefore, the liquid level can be measured over a wide range.

When it is determined that no urea aqueous solution is left in the reducing agent tank 24 based on the concentration measured by the concentration meter of the sensor 30, the liquid level is not estimated, and the liquid level 0 (vacancy) is output. Thus, the fact that no urea aqueous solution is left in the reducing agent tank 24 can be output accurately.

As described in Japanese Laid-open (Kokai) Patent Application Publication No. 2005-351253, the reducing agent tank 24 includes therein: a heater which prevents gelation of the urea aqueous solution in a cold region; and a box-shaped member which confines heat emitted from the heater and accelerates partial thawing of the urea aqueous solution. Thus, the tank cross-sectional area of the reducing agent tank 24 is not constant over the entire length in the height direction of the reducing agent tank 24 and dynamically changes by various arrangement members. Thus, the liquid level may be estimated in consideration of the change of the tank cross-sectional area, as follows.

Figure 5:
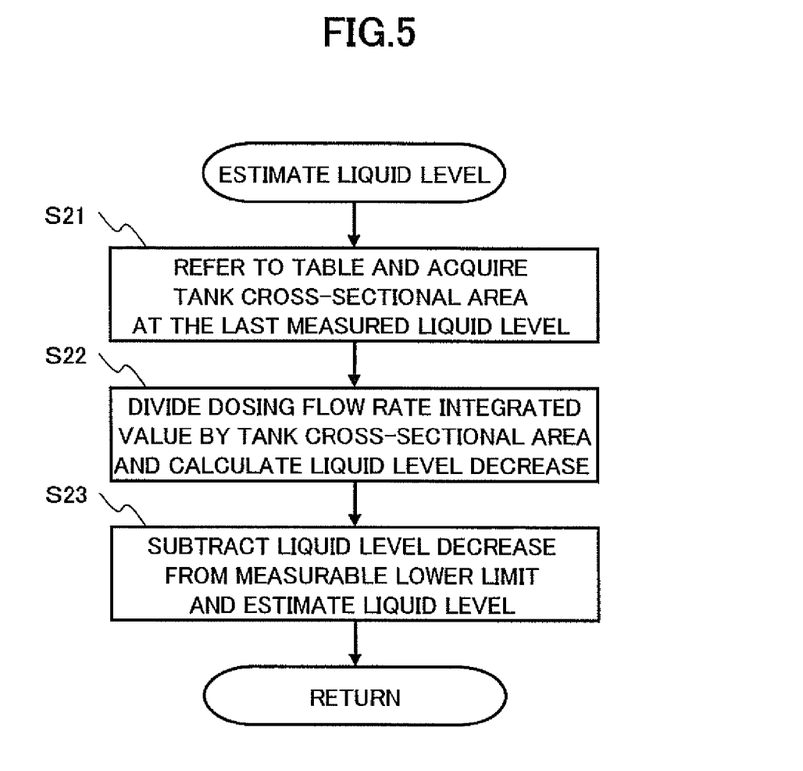
FIG. 5 is a flow chart showing a subroutine that estimates the liquid level in consideration of a dynamically changing tank cross-sectional area.

FIG. 5 shows a subroutine called in step 8 of FIG. 4.

Figure 6:
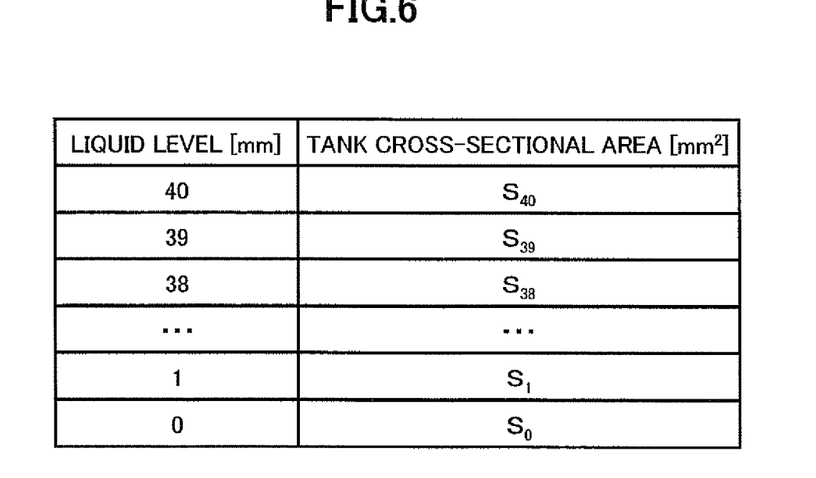
FIG. 6 is an explanatory view showing a table in which the tank cross-sectional area in each liquid level is set.

In step 21, as shown in FIG. 6, the DCU 32 refers to a table in which the tank cross-sectional area in each liquid level of the urea aqueous solution stored in the reducing agent tank 24 is set and acquires the tank cross-sectional area at the last output liquid level. In the illustrated table, although the tank cross-sectional area for each liquid level of 1 mm is set, the tank cross-sectional area may be set at an interval of the liquid level corresponding to the resolution of the liquid level indicator.

In step 22, the DCU 32 divides the dosing flow rate integrated value by the tank cross-sectional area and calculates a decrease of the liquid level after the liquid level L is decreased to the measurable lower limit.

In step 23, the DCU 32 subtracts the decrease of the liquid level from the measurable lower limit and estimates the liquid level of the urea aqueous solution.

In the above-mentioned liquid level measuring device and the exhaust emission purifying apparatus having the liquid level measuring device, even if the tank cross-sectional area dynamically changes according to the liquid level of the urea aqueous solution, the liquid level is estimated in consideration of the change of the tank cross-sectional area. Thus, the estimate accuracy of the liquid level can be enhanced.

Since the dosing flow rate calculated corresponding to the engine operation state and the dosing flow rate actually injection-supplied from the injection nozzle 18 do not completely coincide with each other, the correction to be described below may be performed to approximate the dosing flow rate integrated value of the urea aqueous solution to an actual value. Specifically, when the liquid level L measured by the liquid level indicator of the sensor 30 is equal to or greater than the measurable lower limit, a ratio between the integrated value obtained by sequentially integrating the dosing flow rate corresponding to the engine operation state and a consumption of the urea aqueous solution obtained based on a change of the liquid level L measured by the liquid level indicator is calculated. When the liquid level L measured by the liquid level indicator of the sensor 30 is less than the measurable lower limit, the dosing flow rate integrated value is corrected using the ratio.

The present technique can be applied to not only the case in which the urea aqueous solution is stored in the reducing agent tank but also a case in which light gas oil, gasoline, kerosene or the like mainly composed of ammonia and hydrocarbon is stored in the reducing agent tank.

It should be appreciated that the entire contents of Japanese Patent Application No. 2008-325034, filed on Dec. 22, 2008, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

What is claimed is:

1. An exhaust emission purifying apparatus comprising:
   a reducing agent tank which stores therein a liquid reducing agent or its precursor;
   a reduction catalytic converter configured to reduce and purify nitrogen oxide in exhaust gas using the liquid reducing agent or its precursor;
   a reducing agent dosing device comprising an injection nozzle, a pump module, and a dosing module, the reducing agent dosing device configured to injection-supply the liquid reducing agent or its precursor, stored in the reducing agent tank, to the exhaust upstream side of the reduction catalytic converter at a dosing flow rate corresponding to an engine operation state;

a sensor which is attached to the reducing agent tank so as to hang from a top wall of the reducing agent tank and has a liquid level indicator measuring a liquid level of the liquid reducing agent or its precursor based on a capacitance change and a concentration meter measuring a concentration of the liquid reducing agent or its precursor based on heat discharge characteristics, the liquid level indicator and the concentration meter being unified; and a control unit with a built-in computer, wherein
when the liquid level measured by the liquid level indicator of the sensor is equal to or greater than a predetermined measurable lower limit, the control unit is configured to output a measured liquid level,
when the liquid level measured by the liquid level indicator of the sensor is less than the measurable lower limit and the control unit determines that liquid reducing agent or its precursor is left based on the concentration measured by the concentration meter of the sensor, the control unit is configured to output the liquid level estimated based on an integrated value obtained by sequentially integrating the dosing flow rate of the liquid reducing agent or its precursor injection-supplied by the reducing agent dosing device and a tank cross-sectional area, and
when the liquid level measured by the liquid level indicator of the sensor is less than the measurable lower limit and the control unit determines that no liquid reducing agent or its precursor is left based on the concentration, measured by the concentration meter of the sensor, the control unit is configured to output a liquid level 0.

2. The exhaust emission purifying apparatus according to claim 1, wherein when the control unit determines continuously for a predetermined number of times that no liquid reducing agent or its precursor is left based on the concentration measured by the concentration meter of the sensor, the control unit is configured to output a liquid level 0.

3. The exhaust emission purifying apparatus according to claim 1, wherein when the liquid level measured by the liquid level indicator of the sensor is less than the measurable lower limit and the control unit determines that liquid reducing agent or its precursor is left based on the concentration measured by the concentration meter of the sensor, the control unit is configured to
refer to a table in which a tank cross-sectional area corresponding to each liquid level of the liquid reducing agent or its precursor stored in the reducing agent tank is set in order to acquire the tank cross-sectional area at a last output measurable liquid level, and
estimate the liquid level using the dosing flow rate of the liquid reducing agent or its precursor injection-supplied by the reducing agent dosing device and the tank cross-sectional area at the last output measurable liquid level.

4. The exhaust emission purifying apparatus according to claim 3, wherein the liquid level is estimated by dividing the dosing flow rate of the liquid reducing agent or its precursor injection-supplied by the reducing agent dosing device by the tank cross-sectional area at a last output measurable liquid level, and calculating a decrease of the liquid level after a reduction of the liquid level to a level below the measurable lower limit.

5. The exhaust emission purifying apparatus according to claim 1, wherein when the liquid level measured by the liquid level indicator of the sensor is equal to or greater than the measurable lower limit, the control unit is configured to calculate a ratio between the integrated value obtained by sequentially integrating the dosing flow rate of the liquid reducing agent or its precursor injection-supplied by the reducing agent dosing device and a consumption of the liquid reducing agent or its precursor obtained based on a change of the liquid level measured by the liquid level indicator, and when the liquid level measured by the liquid level indicator of the sensor is less than the measurable lower limit, the control unit is configured to correct a dosing flow rate integrated value using the ratio.

6. A liquid level measuring device comprising:
a sensor which is attached to a reducing agent tank so as to hang from a top wall of the reducing agent tank storing therein a liquid reducing agent or its precursor and has a liquid level indicator measuring a liquid level of the liquid reducing agent or its precursor based on a capacitance change and a concentration meter measuring a concentration of the liquid reducing agent or its precursor based on heat discharge characteristics, the liquid level indicator and the concentration meter being unified; and a control unit with a built-in computer, wherein
when the liquid level measured by the liquid level indicator of the sensor is equal to or greater than a predetermined measurable lower limit, the control unit is configured to output the measured liquid level, and
when the liquid level measured by the liquid level indicator of the sensor is less than the measurable lower limit, the control unit is configured to output the liquid level estimated based on a consumption of the liquid reducing agent or its precursor in the reducing agent tank and a tank cross-sectional area.

* * * * *